(12) United States Patent
Hoshihara

(10) Patent No.: US 6,488,338 B1
(45) Date of Patent: Dec. 3, 2002

(54) RECLINING MECHANISM FOR AN AUTOMOTIVE SEAT

(75) Inventor: Naoaki Hoshihara, Aichi-ken (JP)

(73) Assignee: Aisin Seiki Kabushiki Kaisha, Aichi (JP)

( * ) Notice: Subject to any disclaimer, the term of this patent is extended or adjusted under 35 U.S.C. 154(b) by 0 days.

(21) Appl. No.: 08/496,475

(22) Filed: Jun. 29, 1995

(30) Foreign Application Priority Data

Jun. 30, 1994 (JP) .............................................. 6-170338

(51) Int. Cl.⁷ ................................................ B60N 2/02
(52) U.S. Cl. ........................ 297/367; 297/364; 297/369
(58) Field of Search ................................ 297/367, 363, 297/364, 366, 361.1, 370, 362, 365, 369

(56) References Cited

U.S. PATENT DOCUMENTS

| | | | | |
|---|---|---|---|---|
| 3,737,946 A | | 6/1973 | Giuliani | ........................ 16/139 |
| 4,082,352 A | * | 4/1978 | Bales et al. | .................. 297/364 |
| 4,087,885 A | * | 5/1978 | Gillentine | ................ 297/367 X |
| 4,236,753 A | * | 12/1980 | Ooshiro et al. | .............. 297/364 |
| 4,384,744 A | * | 5/1983 | Barley | ........................ 297/367 |
| 4,435,013 A | * | 3/1984 | Arihara | ....................... 297/364 |
| 4,736,986 A | * | 4/1988 | Kato et al. | .............. 297/369 X |
| 4,874,205 A | * | 10/1989 | Arefinejad et al. | ..... 297/367 X |

FOREIGN PATENT DOCUMENTS

| | | | |
|---|---|---|---|
| AU | 452107 | 4/1972 | |
| CA | 750741 | * 1/1967 | .................. 297/369 |
| DE | 44 41 159 | 5/1995 | |
| EP | 0 024 976 | 3/1981 | |
| FR | 2.139.271 | 1/1973 | |
| FR | 2 383 633 | 10/1978 | |
| JP | 1-151745 | 10/1989 | |
| JP | 1-169149 | 11/1989 | |
| JP | 5-20193 | 5/1993 | |

* cited by examiner

*Primary Examiner*—Laurie K. Cranmer
(74) *Attorney, Agent, or Firm*—Finnegan, Henderson, Farabow, Garrett & Dunner, L.L.P.

(57) ABSTRACT

A reclining mechanism for an automotive seat includes a bracket 23 welded to a side surface of a lower arm 2 and a spiral spring 25 provided around a pair of projections 22, 22 of the bracket 23. One end of the spiral spring 25 is engaged with a pin 26 and the other end thereof is engaged with one of the projections 22, 22 in a play-free arrangement fashion. The bracket 23 is utilized for defining an extent of swinging movement of a manipulating lever 24 and housing a coiled spring 28 for urging the lever 24 in one direction.

6 Claims, 3 Drawing Sheets

RECLINING MECHANISM FOR AN AUTOMOTIVE SEAT

BACKGROUND OF THE INVENTION

The present invention relates to a reclining mechanism for an automotive seat having a bracket for providing a spiral spring therearound.

Conventionally, in a reclining seat mechanism for a vehicle there is provided a tilting angle adjusting mechanism for adjusting the tilting angle of an upper arm to be secured to a seat back frame with respect to a lower arm to be secured to a seat cushion frame. Usually, the tilting angle adjusting mechanism is composed of a combination of pawl teeth and a ratchet or a reduction gear set using a planetary gear. In any case, in the course of the seat back frame being folded forwardly, a spiral spring of which one end is engaged with the upper arm and the other end is engaged with a stationary member of the lower arm will urge the upper arm in a forwardly folded direction.

The disclosure of Japanese Utility Model Laid Open (KOKAI) Publication No. 169149/1989 proposes a reclining seat mechanism for a vehicle having a bracket of L-shape with which a spiral spring is engaged. The other end of the spiral spring is engaged with a rotatable shaft for interlocking a lower arm to be secured to a seat cushion frame and an upper arm to be secured to a seat back frame, or a pin coaxially arranged with an axis of the rotatable shaft. The attachment of the bracket to the upper arm becomes larger in a structure of the upper arm and the engagement of the spiral spring with the rotatable shaft contributes to the injury of the rotatable shaft.

SUMMARY OF THE INVENTION

It is therefore an object of the present invention to provide a reclining mechanism for an automotive seat having a bracket with a pair of opposed projections axially extending from a base thereof.

Another object of the present invention is to provide a reclining mechanism for an automotive seat which performs a play-free arrangement of a spiral spring for urging an upper arm in a forward direction.

To achieve these objects and in accordance with the purpose of the invention, as embodied and broadly described herein, the reclining mechanism of this invention comprises a lower arm to be secured to a seat cushion frame, an upper arm to be secured to a seat back frame, a rotatable shaft passing through both arms and supporting a manipulating lever having a cam hole, a cam member fixedly secured on the rotatable shaft and positioned inside of protuberances on both arms, a pawl plate having pawl teeth at one end which are engaged with or disengaged from a toothed zone formed on a part of an inner side wall of the protuberance of the upper arm, and further having a pin passing through the cam hole of the manipulating lever, a bracket supported on the rotatable shaft and having a pair of opposed projections, a spiral spring provided around the bracket, one end thereof being engaged with one of the projections and the other end thereof being engaged with the upper arm, and the inner diametrical coiled portion of the spiral spring being wound on outer surfaces of the projections.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
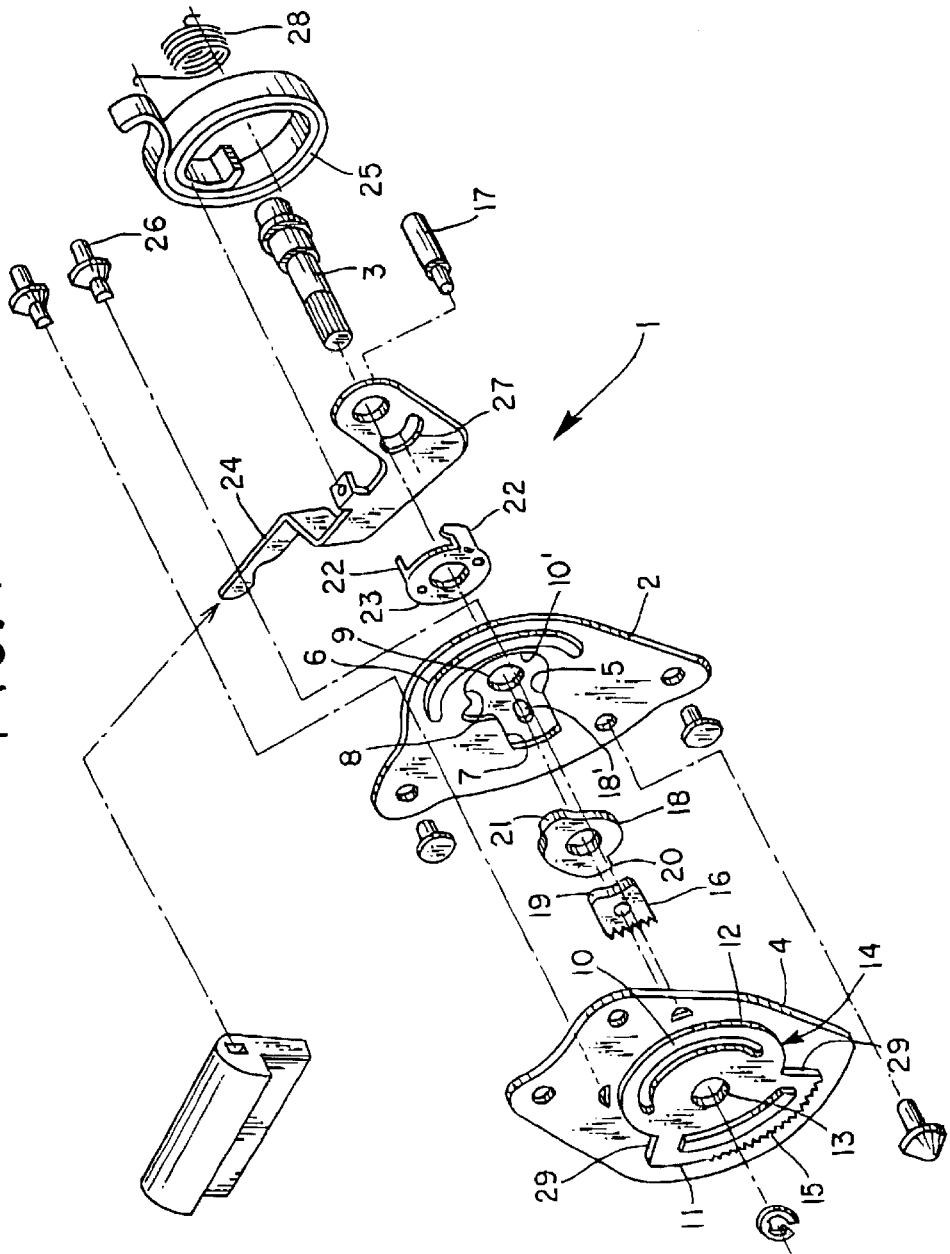
FIG. 1 is a exploded perspective view showing a reclining seat mechanism according to one embodiment of the present invention.

A preferred embodiment of the present invention will now be described with reference to the accompanying drawings.

A reclining mechanism 1 for an automotive seat includes a lower arm 2 to be secured to a seat cushion frame 2' and an upper arm 4 to be secured to a seat back frame 4'. The upper arm 4 is interlocked rockably through a rotatable shaft 3 to the lower arm 2.

The lower arm 2 has an arcuate convex portion 6 and a protuberance 5 outwardly projected in a direction contrary to a projecting direction of the convex portion 6. The protuberance 5 is composed of a rectangular portion 7 and a semicircular portion 8 having a cam surface 10' and a hole 9 for a rotatable shaft 3. The center of curvature of each of the convex portion 6 and the cam surface 10' is concentric with a center of the hole 9. The upper arm 4 has a protuberance 14 having an arcuate portion 10 and inwardly projected in a direction contrary to a projecting direction of the first protuberance 5. The second protuberance 14 is composed of a sector form portion 11 and a semicircular portion 12 which has the arcuate portion 10. The center of curvature of the arcuate portion 10 is concentric with that of a hole 13 for the rotational shaft 3. The convex portion 6 of the lower arm 2 is slidably accommodated in the space between the upper wall of the arcuate portion 10 and the upper wall of the second protuberance 14. This accommodation will assist in smoothly rotating the upper arm 4 with respect to the lower arm 2.

Figure 3:
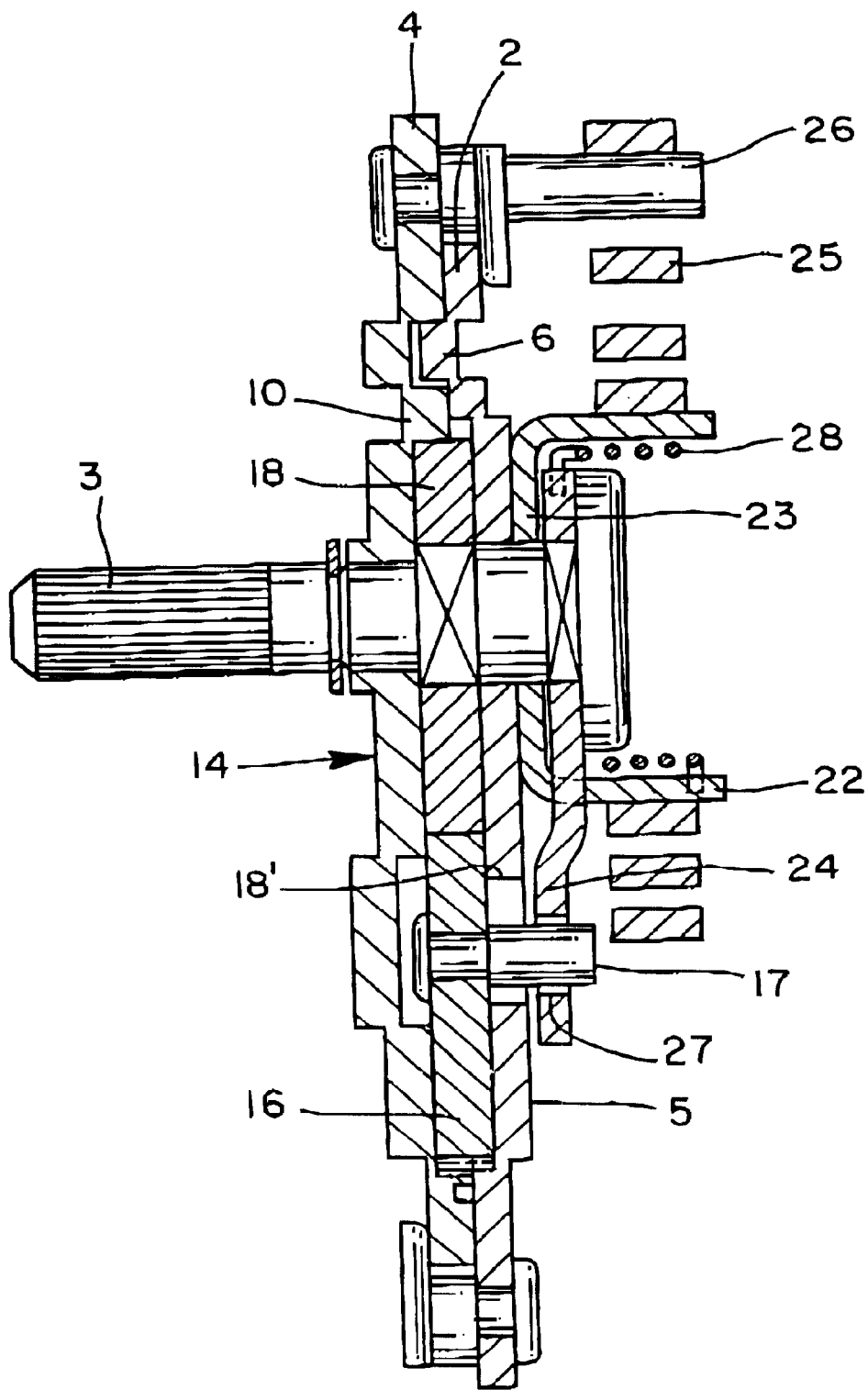
FIG. 3 a sectional view taken along a line A—A in FIG. 2.

A ratchet 15 is formed on a lower inside wall of the second protuberance 14. A pawl plate 16 having pawl teeth is radially slidably arranged in an interior of the rectangular portion 7 of the first protuberance 5 and has a pin 17 which passes through an elongated hole 18' of the lower arm 2. The pawl teeth are engaged with or disengaged from the ratchet 15 in response to the slidable movement of the pawl plate 16. A cam member 18 is arranged in the interior of the semicircular portion 8 of the first protuberance 5 and has a cam surface 20 in slidable contact with a cam surface 19 of the pawl plate 16 and another cam surface 21 in slidable contact with the cam surface 10' of the semicircular portion 8. The cam member 18 is fixedly secured to the rotatable shaft 3. Parts of the pawl plate 16 and the cam member 18 are positioned inside of the second protuberance 14 as shown in FIG. 3.

The rotational shaft 3 inserted into the holes 9, 13 of the arms 2, 4 and the hole of the cam member 18 is provided with a bracket 23 having a pair of projections 22, 22 axially extending and a manipulating lever 24.

A spiral spring 25 urging the upper arm 4 forwardly is wound around the bracket 23 in a manner that one end of the spiral spring 25 is engaged with a pin 26 fixed to the upper arm 4 and the other end thereof is engaged with one of projections 22, 22. The bracket 23 is fixedly secured to the lower arm 2. The pin 17 of the pawl plate 16 is inserted into a cam slot 27 of the manipulating lever 24 fixedly secured to the rotatable shaft 3.

Figure 2:
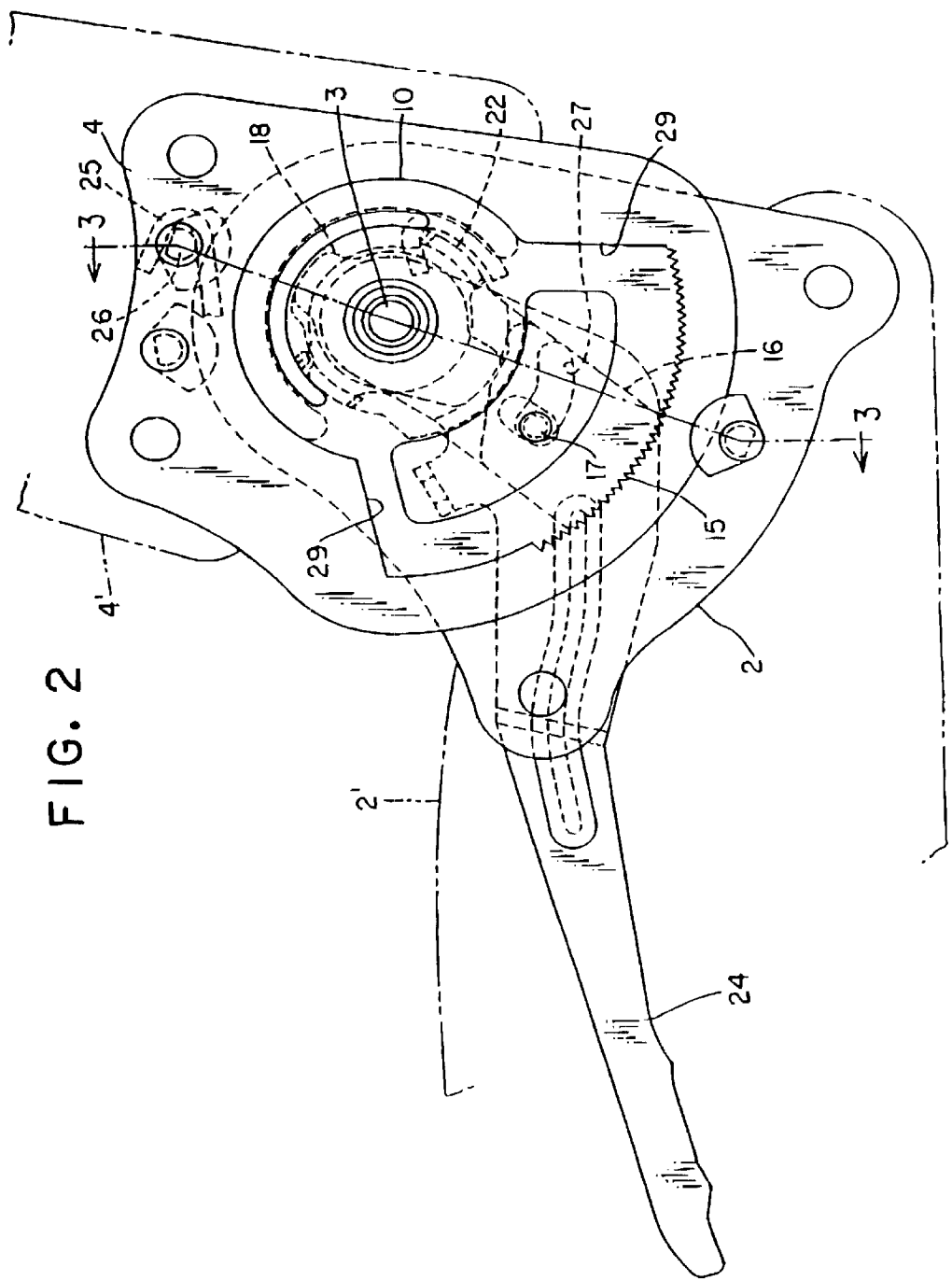
FIG. 2 is a side view of one embodiment illustrated in FIG. 1.

A coil spring 28 is provided inside of the projections 22, 22 to always hold the manipulating lever 24 in a position as shown in FIG. 2. Namely, the lever 24 is biased counter-clockwise as seen in FIG. 2. To this end, one end of the coil spring 28 is engaged with the manipulating lever 24 and the other end thereof is engaged with the one of the projections 22, 22 so that the coil spring 28 is protected by these projections 22, 22.

The restriction of a turning angle of the upper arm 4 with respect to the lower arm 2 is made by abutment of the side of the pawl plate 16 upon a side surface 29 of the interior of the second protuberance 14.

In FIG. 2, when the manipulating lever 24 is raised clockwise against the biasing force of the coiled spring 28, the rotatable shaft 3 is rotated together with the cam member 18 fixed to the rotatable shaft 3 so that the pawl plate 16 slides toward the rotatable shaft 3 by the rotation of the cam member 18 and the radial movement of the pin 17 along the cam slot 27 of the lever 24. Thus, the pawl teeth are disengaged from the ratchet 15 to release the locking relation of the upper arm 4 and the lower arm 2 so that the upper arm 4 can be automatically folded or tilted forwardly by the biasing force of the spiral spring 25 and also forced to a desired position against the biasing force of the spiral spring 25 by a manual operation. The upright position or the forwardly folded position of the upper arm 4 is limited by the abutment of the pawl plate 16 upon one of the side surfaces 29, 29 of the second protuberance 14.

When the upper arm 4 is moved to the desired position and the manipulating lever 24 is returned to an original position, the cam member 18 is rotated by the returning movement of the manipulating lever 24 and the pin 17 is moved radially outwardly thereby along the cam slot 27 of the lever 24. As the result, the pawl teeth of the pawl plate 16 are engaged with the ratchet 15 and both the arms 2, 4 are firmly locked.

As shown in FIG. 1, the bracket 23 comprises a base portion in a circular shape having a hole through which the rotatable shaft 3 passes and the opposed projections 22, 22. The base portion of the bracket 23 is welded to the lower arm 2 and the manipulating lever 24 extends between the projections 22, 22 so that a swinging angle of the manipulating lever 24 can be restricted by the abutment of the manipulating lever 24 upon one of the projections 22, 22.

As described above, the spiral spring 25 is wound around the outer surface of the projections 22, 22. This makes it possible to arrange the spiral spring 25 in the play-free fashion. Thus, the biasing force of the spiral spring 25 is exerted directly on the upper arm 4 without play. The bracket 23 is positioned within a space defined by an inner diametrical portion of the spiral spring 25 so that this space can be used effectively and the structure assembled around the rotatable shaft 3 is compact in size.

As many apparently widely different embodiments of the present invention can be made without departing from the spirit and scope thereof, it is to be understood that the invention is not limited to the specific embodiments thereof except as defined in the appended claims.

What is claimed is:

1. A reclining mechanism for an automotive seat comprising:
   a lower arm to be secured to a seat cushion frame,
   an upper arm to be secured to a seat back frame,
   a rotatable shaft passing through both arms and supporting a manipulating lever having a cam hole,
   a cam member fixedly secured on the rotatable shaft and positioned inside of protuberances on both arms,
   a pawl plate having pawl teeth at one end which are engaged with or disengaged from a toothed zone formed on a part of an inner side wall of the protuberance of the upper arms and further having a pin passing through the cam hole of the manipulating lever,
   a bracket supported on the rotatable shaft and having a pair of opposed projections,
   a spiral spring provided around the bracket, one end thereof being engaged with one of the projections and the other end thereof being engaged with the upper arm, and
   the inner diametrical coiled portion of the spiral spring being wound on outer surfaces of the projections.

2. A reclining mechanism according to claim 1, wherein the bracket is fixed to the lower arm in a manner that rotation of the manipulating lever is restricted.

3. A pawl and ratchet type seat recliner of a seat for a vehicle comprising:
   a lower arm and an upper arm,
   a pawl having pawl teeth at one end and slidably supported on the lower arm through a pin fixed to the pawl,
   a ratchet formed on the upper arm for engagement with or disengagement from the pawl teeth,
   a rotatable shaft passing through both arms and having a cam member mounted thereon for engagement with the pawl,
   a manipulating lever for engaging and disengaging the pawl and the ratchet, and
   a bracket secured on the lower arm and having a pair of segments which axially extend from the bracket,
   a spring disposed between the upper arm and the bracket to permit a play-free arrangement of the spring relative to the movement of the upper arm, and
   a coil spring provided inside of the segments, one end thereof being engaged with the manipulating lever and the other end thereof being engaged with one of the pair of segments for biasing the manipulating lever in one direction.

4. A reclining mechanism according to claim 3, wherein the manipulating lever extends between the projections of the bracket.

5. A reclining mechanism for an automotive seat comprising:

a lower arm to be secured to a seat cushion frame, an upper arm to be secured to a seat back frame, a rotatable shaft passing through both arms and supporting a manipulating lever having a cam hole, a cam member fixedly secured on the rotatable shaft and positioned inside of protuberances on both arms, a pawl plate having pawl teeth at one end which are engaged with or disengaged from a toothed zone formed on a part of an inner side wall of the protuberance of the upper arm, and further having a pin passing through the cam hole of the manipulating lever, a bracket supported on the rotatable shaft and having a pair of opposed projections, the bracket being fixed to the lower arm in a manner that rotation of the manipulating lever is restricted, a spiral spring provided around the bracket, one end thereof being engaged with one of the projections and the other end thereof being engaged with the upper arm, the inner diametrical coiled portion of the spiral spring being wound on outer surfaces of the projections, and a coil spring being provided inside of the projections, one end thereof being engaged with the manipulating lever and the other end thereof being engaged with the bracket for biasing the manipulating lever in one direction.

6. A reclining mechanism according to claim 5, wherein the manipulating lever extends between the projections of the bracket.

* * * * *